Patented Mar. 5, 1946

2,396,209

UNITED STATES PATENT OFFICE 2,396,209

POLYMERIC ACETALS

William H. Sharkey, Wilmington, Del., assignor to E. I. du Pont de Nemours & Company, Wilmington, Del., a corporation of Delaware No Drawing. Application June 18, 1942, Serial No. 447,589

16 Claims. (Cl. 260—73)

This invention relates to new compositions of matter and more particularly to film-forming acetals of hydrolyzed interpolymers of ethylene with vinyl organic esters.

In application Serial No. 446,114, filed June 6, 1942, there is disclosed a novel group of polyalcohols derived by the hydrolysis of interpolymers of ethylene and a vinyl organic ester. It is an object of this invention to convert these polyalcohols into derivatives particularly useful as film-forming compositions. A further object is to prepare film-forming derivatives capable of being converted to insoluble products by the application of heat. A still further object resides in the provision of film-forming derivatives of said polyalcohols the properties of which can be adjusted through a wide range by simple variations in the method of preparation. These and other objects will more clearly appear hereinafter.

The objects above enumerated are realized by my invention which, briefly stated, comprises reacting a hydrolyzed interpolymer of ethylene and a vinyl organic ester with a carbonyl compound from the group consisting of aldehydes and ketones in the presence of a small amount of acidic compound as catalyst. The acetal thus formed is conveniently isolated by pouring the reaction mixture into water, whereupon the acetal separates. It can be stabilized by washing in dilute caustic solution.

The expression "vinyl organic ester" as used herein refers to a vinyl ester of an organic acid.

The ethylene-vinyl organic ester interpolymers for use in this invention are conveniently prepared as follows: A pressure vessel is charged with vinyl organic ester, e. g. vinyl acetate, water, and emulsifying agent, a buffer, and a catalyst. This mixture is blanketed with nitrogen, evacuated to exclude atmospheric oxygen, then ethylene gas is admitted until the desired pressure is obtained. The pressure vessel is heated to 60°-75° C. and agitated for 5-14 hours. The interpolymer is separated from the reaction mixture by coagulation and is then steam distilled to remove volatile materials, washed, and dried on a rubber mill. The product is characterized by means of carbon analysis and intrinsic viscosity. Interpolymers so formed are smoothly and, if desired, completely hydrolyzed to form polymeric alcohols using a 10% excess of potassium hydroxide in ethanol and at a temperature necessary to maintain boiling. The preparation of ethylene-vinyl organic ester interpolymers and the hydrolysis of these is more completely described in U. S. application Serial No. 446,114, filed June 6, 1942.

One preferred method of forming the acetals of this invention is by the direct interaction of an aldehyde or ketone with the hydrolyzed interpolymer in glacial acetic acid solution using phosphoric or sulfuric acid as catalyst. The interpolymer, aldehyde or ketone, and catalyst are agitated in glacial acetic acid to give a good suspension and the whole is heated to 60° C. for 1-24 hours. The reaction mixture is then poured into water, whereupon the acetal separates as a stringy mass. The acetal is stabilized by washing with dilute caustic solution and then with water. If the pure polyacetal is desired, the crude product can be dissolved in dioxane, filtered to remove insoluble material, and the filtrate can be used directly to cast films or poured into water to precipitate the purified polyacetal which then can be washed with water and dried in air.

Another method is the one-step production of the acetal directly from the ethylene-vinyl ester interpolymer by carrying out the hydrolysis and acetalization concurrently. In this instance the interpolymer is dissolved in a mixture of benzene and methanol, the aldehyde or ketone and catalyst added, and the whole heated at the boiling temperature for 8-24 hours with good agitation. The polyacetal formed in the reaction mixture and present in solution can be stabilized by the addition of a slight excess of sodium hydroxide dissolved in methanol. The reaction mixture is then poured into a large volume of water, the benzene, methanol and excess aldehyde are allowed to evaporate, and the polyacetal is separated and dried.

The following examples further illustrate the invention. Proportions are given in parts by weight unless otherwise specified.

Example I

Into a reaction vessel are introduced 10 parts of the hydrolyzed interpolymer obtained by hydrolyzing an ethylene-vinyl acetate interpolymer containing 1 mol of ethylene to 1.2 mols of vinyl acetate, 1.9 parts of paraformaldehyde, 1.86 parts of phosphoric acid, 80 parts of glacial acetic acid, and 10 parts of water. The reaction vessel is heated to 60° C. for 48 hours during which time the polymer gradually dissolves. The resultant polyformal (11.3% acetalized) is isolated by pouring the reaction mixture into a large volume of water, whereupon a stringy mass separates. The polyformal is stabilized by washing in dilute caustic and is then washed with water and dried in air. Purification is carried out by solution of the polyformal in dioxane, filtration, and reprecipitation by pouring the solution into a large volume of water. The precipitated formal of the hydrolyzed ethylene-vinyl acetate interpolymer is dried in air. The yield is 7.5 parts. The polyformal may be redissolved in dioxane and cast into films or it may be hot pressed into tough flexible films which become insolubilized as a result of the heating.

*Example II*

In a reaction vessel are placed 5 parts of the hydrolyzed interpolymer described in Example I, 10 parts of paraformaldehyde, 75 parts of glacial acetic acid, 1.86 parts of phosphoric acid, and 10 parts of water. The reaction vessel is then heated to 60° C. for 40 hours during which time the interpolymer gradually dissolves. The polyformal (100% acetalized) is isolated by pouring the reaction mixture into water, whereupon a stringy mass separates. The polyformal is washed with dilute alkali and water, and is then air dried. The yield is 5 parts. This polyformal of the hydrolyzed ethylene-vinyl acetate interpolymer can not be hot pressed to tough flexible films using a Carver press with the platens heated to 160° C. and under a pressure of 5000 lbs./sq. in. The pressed film swells in dioxane and acetone but does not dissolve.

*Example III*

Into a reaction vessel are placed 5 parts of the hydrolyzed interpolymer described in Example I, 75 parts of glacial acetic acid, 1.8 parts of concentrated sulfuric acid, and 9.5 parts of freshly distilled n-butyraldehyde. The pressure vessel is heated to 60° C. for 24 hours during which time the polymer slowly dissolves. At the end of this time the reaction mixture is poured into a large volume of water, whereupon a brown stringy material separates. This material is thoroughly washed in sodium hydroxide solution, then in water, and is finally dried. The product, the polybutyral of the hydrolyzed ethylene-vinyl acetate interpolymer, is a plastic material softening at approximately 30° C. and is 60–70% acetalized.

*Example IV*

Five parts of the hydrolyzed interpolymer prepared by hydrolyzing an ethylene-vinyl acetate interpolymer containing 1 mol of ethylene per 10.7 mols of vinyl acetate, 11.4 parts of redistilled n-butyraldehyde, 80 parts of glacial acetic acid, and 1.86 parts of phosphoric acid are placed in a reaction vessel. This mixture is heated to 60° C. over a period of 64 hours during which time the polymer slowly dissolves. The reaction mixture is then poured into a large volume of water, which causes precipitation of the polybutyral. The polybutyral is washed in dilute caustic, then in water, and is dried in air. The yield is 6.5 parts. The polybutyral (73% acetalized) of the hydrolyzed ethylene-vinyl acetate interpolymer softens at 83–87° C., is soluble in dioxane, and can be cast into tough flexible films from such solutions.

*Example V*

This example illustrates the acetalization of a partially hydrolyzed ethylene-vinyl acetate interpolymer.

Into a reaction vessel are placed 10 parts of 85% hydrolyzed interpolymer prepared by hydrolyzing an ethylene-vinyl acetate interpolymer containing 1.2 mols of ethylene per mol of vinyl acetate, 0.4 part of paraformaldehyde, 1.8 parts of phosphoric acid, and 80 parts of glacial acetic acid. This mixture is heated to 60° C. over a period of 16 hours during which time the polymer gradually dissolves and the reaction mixture becomes more and more viscous. The reaction mixture is then poured into water, whereupon the polyformal separates as a stringy mass. The polyformal is stabilized by washing with dilute caustic followed by washing with water. The yield is 10.5 parts of polyformal. The polymer is acetalized to the extent of 10–15% and softens at 65–70° C. This polymer can be cast into tough flexible films from dioxane solution.

*Example VI*

This example illustrates the effect of heat-treatment, i. e. baking, on the acetals of this invention.

Six parts of 87% hydrolyzed ethylene-vinyl acetate copolymer containing ethylene and vinyl acetate in a 3:1 molar ratio, 2 parts of 38% aqueous formaldehyde solution, and 0.1 part of concentrated hydrochloric acid are dissolved in 30 parts of a mixture of 2 volumes of 95% alcohol and 1 volume of benzene. The resulting solution is poured on a glass plate and dried at room temperature to give a film. This film is then baked in an oven at 100° C. for one hour. The baked formaldehyde-modified film has a tensile strength of 3900 lbs./sq. in. as compared to about 1400 lbs./sq. in. for the formaldehyde-modified film prior to baking. Furthermore, the formaldehyde-modified film which has been baked is much more pliable and more solvent resistant than the unbaked film. The baked film has an unusually high resistance to flexing, withstanding as many as 7,000,000 flexes before failure as compared with 10,000–100,000 for unbaked films or for films of the original hydrolyzed interpolymer.

While this invention has been illustrated with specific reference to acetals of hydrolyzed ethylene-vinyl acetate interpolymers, it is not of course so limited but applies as well to acetals and ketals (i. e., acetals derived from ketones) of hydrolyzed interpolymers of ethylene with other vinyl organic esters such as vinyl isobutyrate, vinyl pimelate, vinyl 2-ethyl hexanoate, and vinyl benzoate. Hydrolysis products of interpolymers containing a high mol ratio of ethylene to the vinyl ester, hydrolyzed interpolymers in which this ratio is low, and hydrolyzed interpolymers of intermediate compositions interact with carbonyl compounds such as formaldehyde, propionaldehyde, n-butyraldehyde, isobutyraldehyde, furfural, benzaldehyde, methacrolein, acetone, methyl ethyl ketone, and others to produce acetals that can be cast or pressed into tough, flexible films. The film properties of a number of acetals of hydrolyzed ethylene-vinyl acetate copolymers prepared by procedures analogous to those described in the foregoing examples are noted below.

| Acetal | Mol ratio of ethylene-vinyl acetate | Percent acetalized | Softening point, °C. | Cold crack, °C. | Tensile strength, lbs./sq. in. (O. D.) |
|---|---|---|---|---|---|
| Formal | 1.2/1 | | 90–100 | | 2,907 |
| | 1/1.2 | 19.5 | 95–100 | −50 | 3,096 |
| | 1/1.12 | 100 | 150–160 | −22 | 2,000 |
| | 1/2.1 | 69 | 200 | −32 | 2,266 |
| | 1/1.2 | 48 | 44–47 | −3 | 867 |
| n-Butyral | 1/3.3 | 85 | 80–90 | −50 | 1,778 |
| | 1/10.7 | 73 | 83–87 | 20 | 3,200 |
| Isobutyral | 1/1.2 | 100 | 60–70 | −3 | 1,528 |
| Furfural | 1/2.1 | 31 | 120–125 | −43 | 4,050 |
| Benzal | 1/1.2 | 11 | 75–80 | | 800 |

As will be apparent, the films are tough, flexible, and suitable for use as wrapping foils, safety glass interlayers, or fabric coatings. The "cold crack" represents the temperature to which the film must be cooled before it breaks when instantaneously bent through an angle of 180°.

Reaction between the hydrolyzed ethylene-vinyl organic ester interpolymer and aldehyde or ketone is preferably carried out in acetic acid as the solvent media. However, alcohols and other solvents for the polyacetals can also be employed.

In an alternative procedure the hydrolyzed interpolymer is first dissolved in a suitable solvent, e. g. a mixture of alcohol and benzene and the aldehyde or ketone together with catalytic amounts of toluenesulfonic acid or camphorsulfonic acid is thereafter added. The solution is then cast onto a suitable casting surface and after the solvent has evaporated it is baked in an oven at 100°–150° C. This procedure leads to difficultly soluble acetalized hydrolyzed ethylene-vinyl organic ester interpolymers.

Other acidic agents which can be used as catalysts for the preparation of polyacetals of hydrolyzed interpolymers of ethylene and a vinyl ester are hydrochloric acid, sulfuric acid, phosphoric acid, alkyl sulfuric acids, sulfonic acids, chlorinated aliphatic acids, oxalic acid, formic acid and such acid-reacting salts as ferric chloride, aluminum chloride, and zinc chloride. Any strong acid can be used provided that it has no marked degrading action on the materials in the reaction mixture.

The temperatures employed to effect the condensation of carbonyl compounds with hydrolyzed interpolymers of ethylene and a vinyl organic ester range from room temperature to temperatures of about 100° C. However, it is preferred to carry out the condensation at from about 45° C. to about 60° C. The time of reaction varies with the temperature but is usually between about 1 and 24 hours.

It will be apparent that the properties of the polyacetals can be varied over a considerable range depending upon the method of preparation and that certain polyacetals will be preferred over others, depending upon the uses to which they are to be put. The properties of the polyacetals can be adjusted in the following ways: (1) by controlling the molar ratio of ethylene to vinyl ester in the interpolymer that is hydrolyzed and acetalized, (2) by the nature of the aldehyde or ketone utilized, (3) by the degree of acetalization, (4) by the extent to which the interpolymers of ethylene and a vinyl ester are hydrolyzed. As an illustration, the softening point, an important property of these polyacetals, increases with a decrease in the molar ratio of ethylene to the vinyl ester, with a decrease in the degree of acetalization, and with an increase in the degree of hydrolysis. The preferred compositions are to be found in interpolymers in which the molar ratio of ethylene to vinyl ester varies from 3/1 to 1/20, in which the extent of hydrolysis is between 80 and 100%, and in which the extent of acetalization is 5 to 90%. For example, the 75 to 85% acetalized n-butyral of completely hydrolyzed 1/4 interpolymers can be cast into stiff, flexible films softening at 80–90° C. which are suitable as wrapping films, whereas the 70% acetalized n-butyral of the completely hydrolyzed 1/1 interpolymer forms limp, tacky films softening at 40–45° C. which are unsuitable as wrapping films, but suitable for adhesive purposes. However, the 10% acetalized formal of the completely hydrolyzed 1/1 interpolymer forms a stiff, flexible, non-tacky film softening at 130° C. which is suitable for use in leather finishes, molded articles and wire insulation. The softening point, stiffness, and flexibility of the polyformal films can be increased by heating to elevated temperatures over extended periods of time. Interpolymers of ethylene and vinyl organic esters that are only partially hydrolyzed lead to polyacetals that have a lower softening point than those that are completely hydrolyzed. Polybutyrals, polyisobutyrals, and polybenzals have lower softening temperatures than the corresponding polyformals.

The polyacetals of this invention can be hot-pressed or solvent-cast into tough films that are useful as wrapping foils, safety glass interlayers, adhesives for plywood, photographic film bases, and other similar uses. They can also be formed into useful fibers. Other uses for these products are the preparation of molding and coating compositions.

It will be understood of course that a wide deviation from the specific embodiments above described may be practiced without departing from the spirit and scope of the invention defined in the claims which follow.

I claim:
1. An acetal of a hydrolyzed interpolymer of ethylene with a vinyl ester of an organic carboxylic acid.
2. An acetal of a hydrolyzed interpolymer of ethylene with a vinyl ester of an organic carboxylic acid, said interpolymer being 80 to 100% hydrolyzed, and said hydrolyzed interpolymer being from 5 to 90% acetalized, the mol ratio of ethylene to vinyl ester in said interpolymer before hydrolysis having been within the range of from about 3/1 to 1/20.
3. An acetal of a hydrolyzed interpolymer of ethylene with vinyl acetate.
4. An acetal of a hydrolyzed interpolymer of ethylene with vinyl acetate, said interpolymer being 80 to 100% hydrolyzed, and said hydrolyzed interpolymer being from 5 to 90% acetalized, the mol ratio of ethylene to vinyl acetate in said interpolymer before hydrolysis having been within the range of from about 3/1 to 1/20.
5. The acetal resulting from the reaction of formaldehyde and a hydrolyzed alcohol-soluble interpolymer of ethylene with a vinyl ester of an organic carboxylic acid.
6. The acetal resulting from the reaction of formaldehyde and a hydrolyzed interpolymer of ethylene with vinyl acetate, said interpolymer being 80 to 100% hydrolyzed, and said hydrolyzed interpolymer being from 5 to 90% acetalized, the mol ratio of ethylene to vinyl acetate in said interpolymer before hydrolysis having been within the range of from about 3/1 to 1/20.
7. The acetal resulting from the reaction of a butyraldehyde and a hydrolyzed alcohol-soluble interpolymer of ethylene with a vinyl ester of an organic carboxylic acid.
8. The acetal resulting from the reaction of n-butyraldehyde and a hydrolyzed interpolymer of ethylene with vinyl acetate, said interpolymer being 80 to 100% hydrolyzed, and said hydrolyzed interpolymer being from 5 to 90% acetalized, the mol ratio of ethylene to vinyl acetate in said interpolymer before hydrolysis having been within the range of from about 3/1 to 1/20.
9. The process for preparing an acetal of a hydrolyzed interpolymer of ethylene with a vinyl ester of an organic carboxylic acid, which comprises reacting a hydrolyzed alcohol-soluble interpolymer of ethylene and a vinyl ester of an or- ganic carboxylic acid with a carbonyl compound from the group consisting of aldehydes and ketones, in the presence of an organic solvent for the acetal, and a catalyst.

10. The process for preparing an acetal of a hydrolyzed interpolymer of ethylene with vinyl acetate which comprises heating a hydrolyzed alcohol-soluble interpolymer of ethylene and vinyl acetate with a carbonyl compound from the group consisting of aldehydes and ketones, for a period of from about one to about 24 hours at a temperature of from about 45° C. to about 60° C., in the presence of acetic acid and a catalyst.

11. The process according to claim 10 wherein the carbonyl compound is formaldehyde.

12. The process according to claim 10 wherein the carbonyl compound is n-butyraldehyde.

13. As a film-forming composition which, after casting upon a suitable surface and evaporating the solvent from the cast solution whereby to form a soluble film and thereafter baking said film at a temperature within the range of from 100° C. to 150° C., provides a substantially insoluble film, a solution comprising essentially a hydrolyzed alcohol-soluble interpolymer of ethylene with a vinyl ester of an organic carboxylic acid, a carbonyl compound from the group consisting of aldehydes and ketones, and a catalyst.

14. A film comprising essentially an acetal of a hydrolyzed interpolymer of ethylene with a vinyl ester of an organic carboxylic acid, said film having been baked at a temperature of from 100° C. to 150° C.

15. A film comprising essentially an acetal resulting from the reaction of formaldehyde and a hydrolyzed interpolymer of ethylene with vinyl acetate, the mol ratio of ethylene to vinyl acetate in said interpolymer before hydrolysis having been within the range of from about 3/1 to 1/20, said interploymer being 80 to 100% hydrolyzed, said hydrolyzed interpolymer being from 5 to 90% acetalized, and said film having been baked at a temperature within the range of from 100° C. to 150° C.

16. A film comprising essentially an acetal resulting from the reaction of n-butyraldehyde and a hydrolyzed interpolymer of ethylene with vinyl acetate, the mol ratio of ethylene to vinyl acetate in said interpolymer before hydrolysis having been within the range of from about 3/1 to 1/20, said interpolymer being 80 to 100% hydrolyzed, said hydrolyzed interpolymer being from 5 to 90% acetalized, and said film having been baked at a temperature within the range of from 100° C. to 150° C.

WILLIAM H. SHARKEY.

Certificate of Correction

Patent No. 2,396,209.             March 5, 1946.

WILLIAM H. SHARKEY

It is hereby certified that error appears in the printed specification of the above numbered patent requiring correction as follows: Page 2, first column, line 23, Example 2, strike out *not*; and that the said Letters Patent should be read with this correction therein that the same may conform to the record of the case in the Patent Office.

Signed and sealed this 23rd day of July, A. D. 1946.

[SEAL]

LESLIE FRAZER,
*First Assistant Commissioner of Patents.* ganic carboxylic acid with a carbonyl compound from the group consisting of aldehydes and ketones, in the presence of an organic solvent for the acetal, and a catalyst.

10. The process for preparing an acetal of a hydrolyzed interpolymer of ethylene with vinyl acetate which comprises heating a hydrolyzed alcohol-soluble interpolymer of ethylene and vinyl acetate with a carbonyl compound from the group consisting of aldehydes and ketones, for a period of from about one to about 24 hours at a temperature of from about 45° C. to about 60° C., in the presence of acetic acid and a catalyst.

11. The process according to claim 10 wherein the carbonyl compound is formaldehyde.

12. The process according to claim 10 wherein the carbonyl compound is n-butyraldehyde.

13. As a film-forming composition which, after casting upon a suitable surface and evaporating the solvent from the cast solution whereby to form a soluble film and thereafter baking said film at a temperature within the range of from 100° C. to 150° C., provides a substantially insoluble film, a solution comprising essentially a hydrolyzed alcohol-soluble interpolymer of ethylene with a vinyl ester of an organic carboxylic acid, a carbonyl compound from the group consisting of aldehydes and ketones, and a catalyst.

14. A film comprising essentially an acetal of a hydrolyzed interpolymer of ethylene with a vinyl ester of an organic carboxylic acid, said film having been baked at a temperature of from 100° C. to 150° C.

15. A film comprising essentially an acetal resulting from the reaction of formaldehyde and a hydrolyzed interpolymer of ethylene with vinyl acetate, the mol ratio of ethylene to vinyl acetate in said interpolymer before hydrolysis having been within the range of from about 3/1 to 1/20, said interploymer being 80 to 100% hydrolyzed, said hydrolyzed interpolymer being from 5 to 90% acetalized, and said film having been baked at a temperature within the range of from 100° C. to 150° C.

16. A film comprising essentially an acetal resulting from the reaction of n-butyraldehyde and a hydrolyzed interpolymer of ethylene with vinyl acetate, the mol ratio of ethylene to vinyl acetate in said interpolymer before hydrolysis having been within the range of from about 3/1 to 1/20, said interpolymer being 80 to 100% hydrolyzed, said hydrolyzed interpolymer being from 5 to 90% acetalized, and said film having been baked at a temperature within the range of from 100° C. to 150° C.

WILLIAM H. SHARKEY.

Certificate of Correction

Patent No. 2,396,209.                                                                                     March 5, 1946.

WILLIAM H. SHARKEY

It is hereby certified that error appears in the printed specification of the above numbered patent requiring correction as follows: Page 2, first column, line 23, Example 2, strike out *not*; and that the said Letters Patent should be read with this correction therein that the same may conform to the record of the case in the Patent Office.

Signed and sealed this 23rd day of July, A. D. 1946.

[SEAL]

LESLIE FRAZER,
*First Assistant Commissioner of Patents.*